(12) United States Patent
Park et al.

(10) Patent No.: US 10,798,475 B2
(45) Date of Patent: Oct. 6, 2020

(54) DISPLAY DEVICE

(71) Applicant: Samsung Display Co., Ltd., Yongin-si (KR)

(72) Inventors: Yong Han Park, Yongin-si (KR); Young Seok Seo, Yongin-si (KR); Sang Min Kim, Yongin-si (KR); Seung Ho Baek, Yongin-si (KR); Seung Hoon Lee, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/047,004

(22) Filed: Jul. 27, 2018

(65) Prior Publication Data
US 2019/0246190 A1 Aug. 8, 2019

(30) Foreign Application Priority Data
Feb. 5, 2018 (KR) .................. 10-2018-0014211

(51) Int. Cl.
H04R 1/02 (2006.01)
G06K 9/00 (2006.01)

(52) U.S. Cl.
CPC .......... H04R 1/028 (2013.01); G06K 9/0002 (2013.01); G06K 9/0004 (2013.01); H04R 2499/15 (2013.01)

(58) Field of Classification Search
CPC ............ B42D 15/022; H04M 2250/12; H04R 2499/11
USPC ............................................. 381/333, 58, 59
See application file for complete search history.

(56) References Cited

U.S. PATENT DOCUMENTS

| 7,489,066 | B2 | 2/2009 | Scott et al. | |
|---|---|---|---|---|
| 9,897,696 | B2 | 2/2018 | Lee et al. | |
| 9,945,818 | B2 | 4/2018 | Ganti et al. | |
| 2009/0141459 | A1* | 6/2009 | Weber | F21V 33/0052 361/728 |
| 2011/0136479 | A1* | 6/2011 | Kim | H04M 1/6016 455/418 |
| 2016/0345113 | A1* | 11/2016 | Lee | G01S 15/04 |
| 2017/0024597 | A1* | 1/2017 | Cho | G06F 3/041 |

FOREIGN PATENT DOCUMENTS

| KR | 10-2015-0063780 | 6/2015 |
|---|---|---|
| KR | 10-2016-0124156 | 10/2016 |
| KR | 10-2016-0137240 | 11/2016 |
| KR | 10-1781909 | 9/2017 |
| KR | 10-2017-0115225 | 10/2017 |

* cited by examiner

Primary Examiner — George C Monikang
(74) Attorney, Agent, or Firm — H.C. Park & Associates, PLC

(57) ABSTRACT

A display device including a display surface for displaying an image; and a speaker unit located on the display surface, the speaker unit generating a sound and emitting the generated sound to the outside. The speaker unit may detect a fingerprint of a user.

11 Claims, 3 Drawing Sheets

DISPLAY DEVICE

CROSS-REFERENCE TO RELATED APPLICATION

This application claims priority from and the benefit of Korean Patent Application No. 10-2018-0014211, filed on Feb. 5, 2018, which is hereby incorporated by reference for all purposes as if fully set forth herein.

BACKGROUND

Field

Exemplary embodiments of the inventive concepts relate to a display device.

Discussion of the Background

With the development of information technologies, the importance of a display device, which functions as a connection medium between a user and information, increases. Accordingly, display devices, such as a liquid crystal display device and an organic light emitting display device, are increasingly being used. Recently, display devices, including touch sensors for sensing touches, fingerprint sensors, pressure sensors, etc., have recently been developed.

In addition, display devices have recently been developed which have display areas designed in notch shapes so as to enlarge the display areas and reduce non-display areas.

The above information disclosed in this Background section is only for understanding of the background of the inventive concepts, and, therefore, it may contain information that does not constitute prior art.

SUMMARY

Exemplary embodiments of the invention provide a display device capable of detecting a fingerprint through an area in which a speaker unit is located.

Additional features of the inventive concepts will be set forth in the description which follows, and in part will be apparent from the description, or may be learned by practice of the inventive concepts.

An exemplary embodiment of the invention provides a display device including a display surface for displaying an image and a speaker unit located on the display surface. The speaker unit generates a sound and emits the generated sound to the outside, wherein the speaker unit detects a fingerprint of a user.

The display surface may include a display area having a shape including a notch. The speaker unit may be disposed in an area in which the notch is formed.

The speaker unit may include: a speaker cover in which speaker holes for emitting the sound to the outside are formed; and sensing elements located in the speaker holes.

The speaker unit may further include a sensing substrate having the sensing elements disposed thereon, the sensing substrate being disposed under the speaker cover.

The speaker unit may further include a speaker module disposed under the sensing substrate, the speaker module generating the sound.

Front surfaces of the sensing elements may be set at a lower level than that of the speaker cover.

The sensing elements may be implemented as light sensing elements.

The front surfaces of the sensing elements may be set to have the same height as the front surface of the speaker cover.

The sensing elements may be implemented as ultrasonic sensing elements.

Each of the sensing elements may include: a piezoelectric element for generating a sensing signal, corresponding to a pressure applied thereto; and upper and lower electrodes for outputting the sensing signal.

Another exemplary embodiment of the invention provides a display device having a display surface divided into a display area having a shape including a notch and a non-display area surrounding the display area, the display device including: a speaker unit including a speaker cover in which speaker holes for emitting a sound to the outside are formed; and a fingerprint sensor including sensing elements located in the speaker holes, wherein the speaker unit is disposed in an area in which the notch is formed.

The sensing elements may be implemented as light sensing elements.

Front surfaces of the sensing elements may be set at a lower level than that of the speaker cover.

The sensing elements may sense reflected light obtained as light generated by a display element disposed in the display area is reflected by a fingerprint of a user.

The sensing elements may be implemented as ultrasonic sensing elements.

The front surfaces of the sensing elements may be set to have the same height as the front surface of the speaker cover.

The speaker unit may further include a speaker module for generating the sound.

The speaker module may further generate an ultrasonic signal. The sensing elements may sense a pressure change corresponding to the ultrasonic signal.

Each of the sensing elements may include: a piezoelectric element for generating a sensing signal, corresponding to a pressure applied thereto; and upper and lower electrodes for outputting the sensing signal.

The sensing elements may be in contact with the fingerprint of the user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
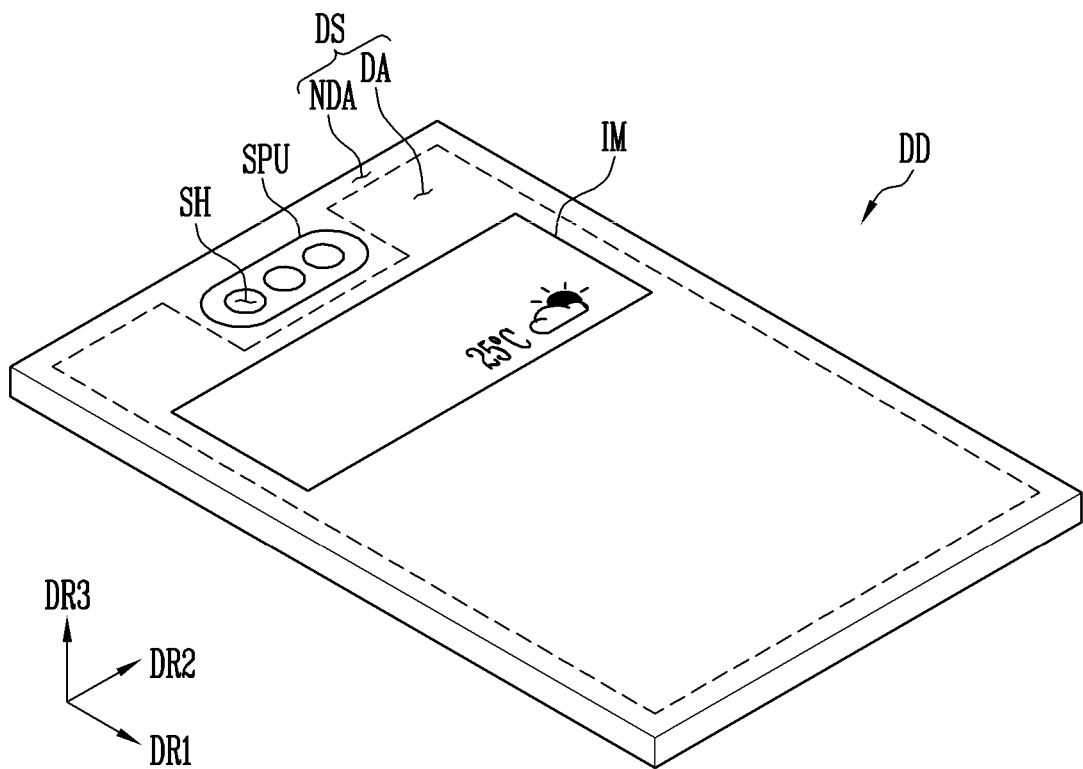
FIG. 1 is a view illustrating a display device according to an exemplary embodiment of the invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. Various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. Like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

FIG. 1 is a view illustrating a display device DD according to an exemplary embodiment of the invention.

Referring to FIG. 1, the display device DD includes a display surface DS.

The display surface DS is located at a front surface of the display device DD. The display surface DS displays an image IM. The display surface DS is parallel to a surface defined by a first direction DR1 and a second direction DR2. A normal direction of the display surface DS, i.e., a thickness direction of the display device DD with respect to the display surface DS indicates a third direction DR3.

A front surface (or top surface) and a back surface (or bottom surface) of each member or unit described hereinbelow is distinguished by the third direction DR3. However, the first to third directions DR1, DR2, and DR3 illustrated in this exemplary embodiment are merely illustrative, and the directions indicated by the first to third directions DR1, DR2, and DR3 are relative concepts, and may be changed into other directions. Hereinafter, first to third directions are directions respectively indicated by the first to third directions DR1, DR2, and DR3, and are designated by like reference numerals.

In an exemplary embodiment of the invention, the display device DD including a planar display surface DS is illustrated, but the inventive concepts are not limited thereto. The display device DD may include a curved display surface DS or a stereoscopic display surface DS.

The display device DD according to an exemplary embodiment of the invention may be a rigid display device. However, the inventive concepts are not limited thereto, and the display device DD according to another exemplary embodiment may be a flexible display device.

A display device DD applicable to a mobile phone terminal is exemplarily illustrated in this disclosure Although not shown in the drawings, electronic modules, a camera module, a power module, and the like, which are mounted on a main board, are disposed together with the display device DD in a bracket/case, etc., thereby constituting a mobile phone terminal.

The display device DD according to an exemplary embodiment may be applied to not only to large-sized electronic devices, such as televisions and monitors, but also to medium-/small-sized electronic devices such as tablet PCs, vehicle navigation systems, game consoles, and smart watches.

The display surface DS includes a display area DA in which the image IM is displayed and a non-display area NDA adjacent to the display area DA. That is, the display surface DS may be divided into the display area DA and the non-display area NDA.

The display area DA is an area in which an image is displayed, and the non-display area NDA is an area in which any image is not displayed.

Although not shown in the drawings, display elements are arranged in the display area DA.

In FIG. 1, temperature and weather images are illustrated as an example of the image IM.

As shown in FIG. 1, the display area has a shape including a quadrangular notch. Here, the notch refers to a shape obtained by taking off a portion of a planar part in a certain shape. However, the inventive concepts are not limited thereto, and the display area DA and the non-display area NDA may be designed in various shapes (e.g., a convex polygonal shape, a concave polygonal shape, a circular shape, an elliptical shape, and the like).

The non-display area NDA may surround the display area DA.

The display device DD may further include a fingerprint sensor and a speaker unit SPU.

The fingerprint sensor according to an exemplary embodiment of the inventive concepts may be integrally formed with the speaker unit SPU. Therefore, in the present disclosure, the fingerprint sensor may be described as a separate component, or sensing elements and a sensing substrate, which are described to be included in the speaker unit SPU, may be characterized as the fingerprint sensor.

The speaker unit SPU may be located on the display surface DS. For example, the speaker unit SPU may be disposed in the non-display area NDA, i.e., in an area in which the notch is formed. In other exemplary embodiments, the speaker unit SPU may be located at one side of the display surface DA.

The speaker unit SPU may generate a sound and emit the generated sound to the outside. For example, the speaker unit SPU may include a speaker cover in which speaker holes SH for emitting a sound are formed and a speaker module for generating a sound.

For convenience of description, three speaker holes SH are illustrated in FIG. 1, but the inventive concepts are not limited thereto. In other exemplary embodiments, one, two, four or more speaker holes SH may be formed in the speaker cover.

In addition, the speaker unit SPU may detect a fingerprint of a user. For example, the speaker unit SPU may further include sensing elements for detecting the fingerprint of the user and a sensing substrate on which the sensing elements are disposed.

This will be described in detail later with reference to FIGS. 2 to 5.

In some exemplary embodiments, the display device DD may further include a light source (not shown) or an ultrasonic generator (not shown).

Figure 2:
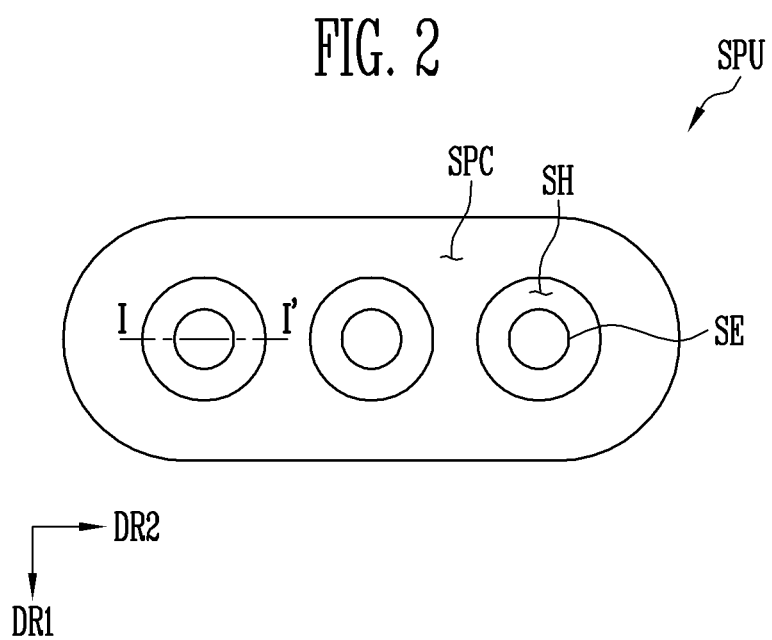
FIG. 2 is a view illustrating a speaker unit according to an exemplary embodiment of the invention.

FIG. 2 is a view illustrating a speaker unit SPU according to an exemplary embodiment of the invention.

In FIG. 2, the speaker unit SPU viewed from the surface defined by the first direction DR1 and the second direction DR2 is illustrated.

Referring to FIG. 2, the speaker unit SPU may include a speaker cover SPC and sensing elements SE. Although not shown in FIG. 2, the speaker unit SPU may further include a speaker module and a sensing substrate.

Speaker holes SH may be formed in the speaker cover SPC. For convenience of description, a case where three speaker holes SH are formed in the speaker cover SPC is illustrated in FIG. 2, but the inventive concepts are not limited thereto.

The speaker hole SH may have a circular shape, but the inventive concepts are not limited thereto. In other exemplary embodiments, the speaker hole SH may have various shapes (e.g., a polygonal shape, an elliptical shape, and the like).

The speaker holes SH may be arranged on one row, but the present disclosure is not limited thereto. In other exemplary embodiments, the speaker holes SH may be arranged on two or more rows.

The sensing elements SE may be located in the speaker holes SH.

The sensing elements SE may be provided in a one-to-one correspondence with the speaker holes SH.

FIG. 2 illustrates one sensing element SE located in the speaker hole SH, but the inventive concepts are not limited thereto. In other exemplary embodiments, at least two sensing elements SE may be located in one speaker hole SH.

The size, number, arrangement form, and/or density (e.g., resolution) of the sensing elements SE are not particularly limited. As an example, the sensing elements SE may be distributed in the speaker hole SH according to a predetermined distance or distribution degree. In other exemplary embodiments, the sensing elements SE may be densely distributed in the speaker hole SH.

That is, the sensing elements may be distributed in the speaker hole SH with a density sufficient to detect the shape of a fingerprint.

In some exemplary embodiments, the sensing elements SE may be implemented with light sensing elements. At this time, the sensing elements SE may sense reflected light obtained as light generated from the display elements arranged in the display area is reflected from a fingerprint of a user. However, the inventive concepts are not limited thereto, and the sensing elements SE may sense reflected light obtained as light generated from a separate light source is reflected from the fingerprint of the user.

In some exemplary embodiments, the sensing elements SE may be implemented with ultrasonic sensing elements. At this time, the sensing elements SE may detect a fingerprint of a user by sensing a pressure change corresponding to an ultrasonic signal generated from the speaker module. However, the inventive concepts are not limited thereto, and the sensing elements SE may detect the fingerprint of the user by sensing a pressure change corresponding to an ultrasonic signal generated from a separate ultrasonic generator.

Figure 3:
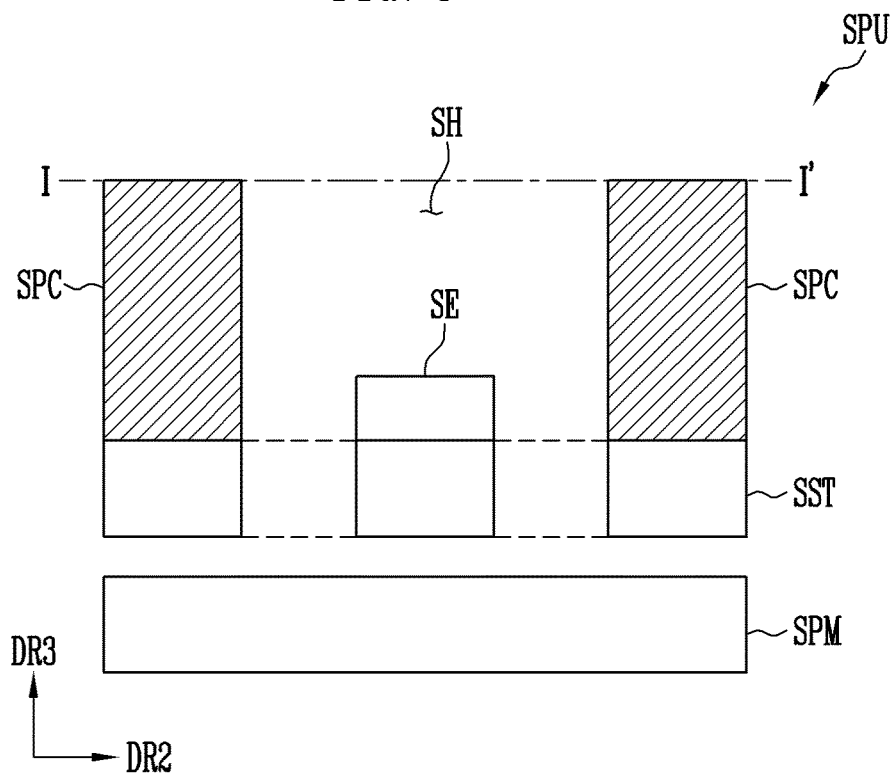
FIG. 3 is a view illustrating a section taken along line I-I' of the speaker unit illustrated in FIG. 2 according to an exemplary embodiment of the invention.

FIG. 3 is a view illustrating a section taken along line I-I' shown in FIG. 2 of the speaker unit SPU according to an exemplary embodiment of the invention.

In FIG. 3, a sensing element SE implemented as a light sensing element is illustrated.

Referring to FIG. 3, the speaker unit SPU may include a speaker cover SPC, a sensing element SE, a sensing substrate SST, and a speaker module SPM.

The speaker cover SPC may be located on the speaker module SPM and the sensing substrate SST. The speaker cover SPC may protect the speaker module SPM from the outside.

Although not shown in FIG. 3, a protective layer for preventing a foreign substance or water introduced through a speaker hole SH from penetrating into the speaker unit SPU may be further disposed on a back surface of the speaker cover SPC.

Speaker holes SH may be formed in the speaker cover SPC.

The speaker hole SH may be formed to allow a sound generated by the speaker module SPM to be emitted to the outside therethrough.

The sensing element SE may be located in the speaker hole SH. The sensing element SE may be disposed on the sensing substrate SST.

The sensing element SE may sense reflected light obtained as light is reflected from a fingerprint of a user. In some exemplary embodiments, the light may be generated by the display elements arranged in the display area or a separate light source.

The sensing element SE may output a sensing signal corresponding to the reflected light incident thereinto. Thus, the display device DD (see FIG. 1) can detect the fingerprint of the user by synthesizing sensing signals input from the sensing elements SE.

A front surface of the sensing element SE may be set at a lower level than that of the speaker cover SPC. At this time, the speaker cover SPC may serve as a partition wall with respect to light incident into the sensing element SE.

Thus, the sensing sensitivity of the display device according to the inventive concepts can be improved.

The sensing substrate SST may be located under the speaker cover SPC and the sensing element SE. For example, the sensing substrate SST may be a component for fixing the sensing element SE to the speaker cover SPC while allowing the sensing element SE to be located in the speaker hole SH. In some exemplary embodiments, the sensing substrate SST may be fixed to the speaker cover SPC.

Although not shown in the drawings, the sensing substrate SST may include a plurality of conducting wires for driving the sensing element SE.

The speaker module SPM may be located under the sensing substrate SST.

A substrate hole may be formed in the sensing substrate SST such that a sound generated by the speaker module SPM is emitted to the outside. At this time, the substrate hole may be connected to the speaker hole SH. That is, the substrate hole may be integrally formed with the speaker hole SH.

In some exemplary embodiments, the sensing substrate SST may be a transmissive substrate. For example, the sensing substrate SST may be a substrate made of a transparent or translucent material. Also, the sensing substrate SST may be a rigid or flexible substrate, and the material of the sensing substrate SST is not particularly limited.

In some exemplary embodiments, the sensing substrate SST may be configured to include at least one insulating layer. For example, the sensing substrate SST may be configured to have a thin film encapsulation layer including at least one organic layer and at least one inorganic layer.

The speaker module SPM may generate a sound. The sound generated by the speaker module SPM may be emitted to the outside through the speaker hole SH.

The speaker module SPM may be implemented as a voice coil type speaker module, but the present disclosure is not limited thereto. In some exemplary embodiments, the speaker module SPM may be implemented as a Micro Electro Mechanical System (MEMS) type speaker module.

Figure 4:
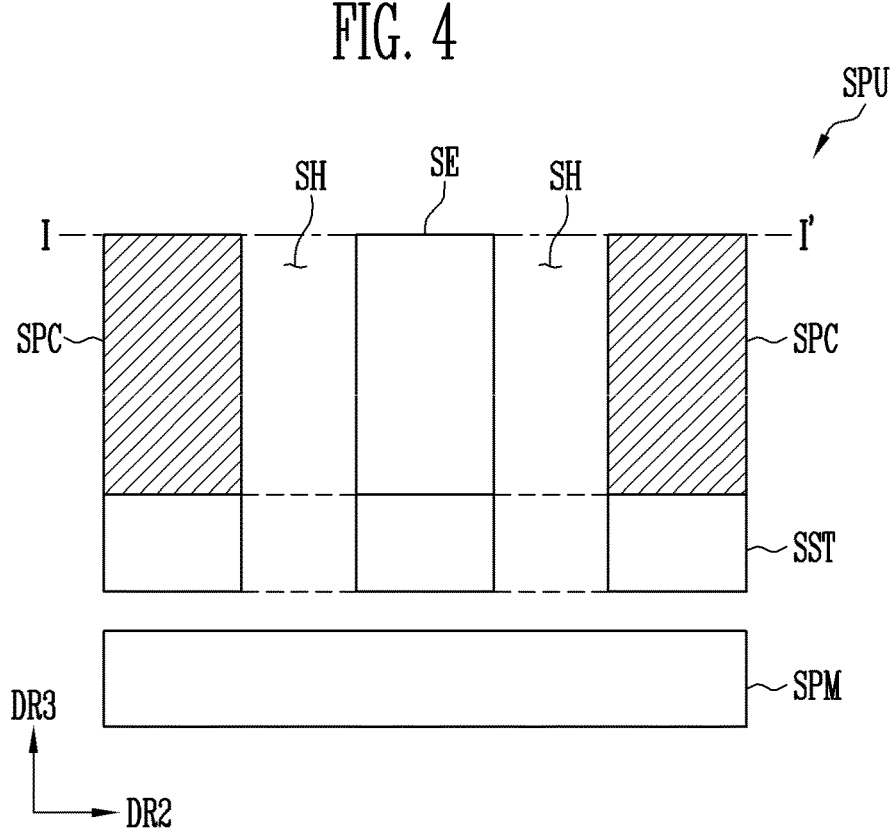
FIG. 4 is a view illustrating a section taken along line I-I' of the speaker unit illustrated in FIG. 2 according to another exemplary embodiment of the invention.

FIG. 4 is a view illustrating a section taken along line I-I' shown in FIG. 2 of the speaker unit SPU according to another exemplary embodiment of the invention.

In FIG. 4, a sensing element SE implemented as an ultrasonic sensing element is illustrated.

In FIG. 4, only those portions different from those of the speaker unit SPU of FIG. 3 will be mainly described to avoid redundancy.

While the speaker unit SPU shown in FIG. 3 includes the sensing element SE implemented as the light sensing element, the speaker unit SPU shown in FIG. 4 includes the sensing element SE implemented as the ultrasonic sensing element.

The sensing elements may detect a fingerprint of a user by sensing a pressure change corresponding to an ultrasonic signal. In some exemplary embodiments, the ultrasonic signal may be generated by the speaker module SPM, the sensing element SE or a separate ultrasonic generator.

For example, the speaker module SPM, the sensing element SE or the separate ultrasonic generator may generate an ultrasonic signal in an ultrasonic frequency band (e.g., a signal in a frequency band of 40 KHz to 50 KHz).

In some exemplary embodiments, the sensing element SE may be implemented with a contact type ultrasonic transducer (e.g., an enclosed type ultrasonic transducer) or a non-contact type ultrasonic transducer (e.g., a resonant type ultrasonic transducer).

The front surface of the sensing element SE may be set to have the same height as the front surface of the speaker cover SPC. For example, the sensing element SE may be in contact with the fingerprint of the user. At this time, the sensing element SE can more easily sense a pressure change corresponding to the ultrasonic signal.

Thus, the sensing sensitivity of the display device including the speaker unit according to the inventive concepts can be improved.

Figure 5:
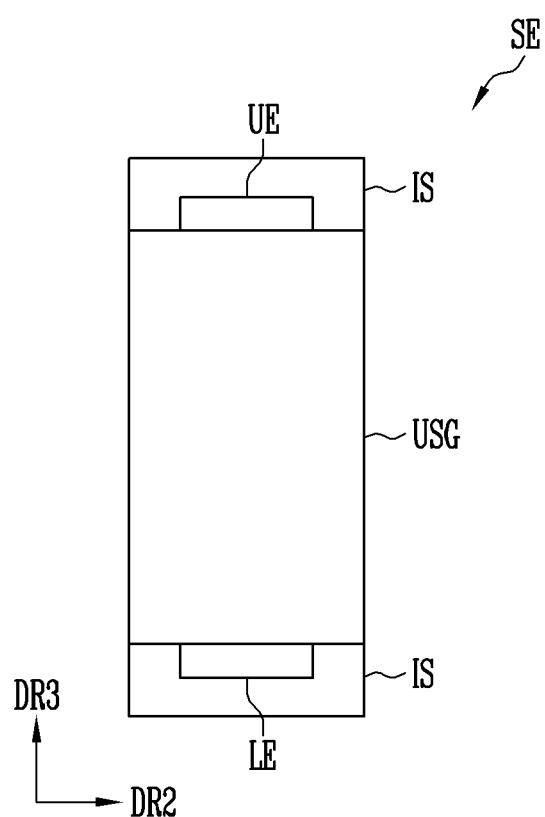
FIG. 5 is a view illustrating a sensing element according to exemplary embodiment of the invention.

FIG. 5 is a view illustrating a sensing element according to an exemplary embodiment of the invention.

In FIG. 5, a sensing elements SE implemented as an ultrasonic sensing element (e.g., a piezoelectric element) is illustrated.

The sensing element SE may include a piezoelectric element USG, an upper electrode UE, a lower electrode LE, and an insulating layer IS.

The piezoelectric element USG may generate a sensing signal (current or voltage), corresponding to a pressure applied thereto.

The upper electrode UE may be disposed at an upper end of the piezoelectric part USG, and the lower electrode LE may be disposed at a lower end of the piezoelectric part USG.

The sensing signal generated by the piezoelectric part USG may be output through a conducting wire (not shown) connected to the upper electrode UE and the lower electrode LE. The display device DD (see FIG. 1) may detect a fingerprint of a user by synthesizing sensing signals.

The insulating layer IS may be disposed under the upper electrode UE and the lower electrode LE.

According to the exemplary embodiments, the display device can detect a fingerprint through an area in which the speaker unit is located.

Further, according to the exemplary embodiments, the sensing elements are located in the speaker hole of the speaker cover, so that the sensing sensitivity of the display device can be improved by reducing blur.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:
a display surface configured to display an image; and
a speaker unit exposed by the display surface, the speaker unit configured to generate a sound and emit the generated sound to the outside,
wherein:
the speaker unit is configured to detect a fingerprint of a user;
the speaker unit comprises:
a speaker cover comprising speaker holes for emitting the sound to the outside;
sensing elements respectively disposed in the speaker holes; and
a sensing substrate directly connected to the sensing elements and the speaker cover;
the sensing substrate fixes the sensing elements to the speaker cover while allowing the sensing elements to be located in the speaker holes;
front surfaces of the sensing elements are set at a lower level than a front surface of the speaker cover; and
the sensing elements are implemented as light sensing elements.

2. The display device of claim 1, wherein:
the display surface comprises a display area having a shape including a notch; and
the speaker unit is disposed in an area in which the notch is formed.

3. The display device of claim 1, wherein the sensing substrate has the sensing elements disposed thereon, the sensing substrate being disposed under the speaker cover.

4. The display device of claim 3, wherein the speaker unit further comprises a speaker module disposed under the sensing substrate, the speaker module configured to generate the sound.

5. The display device of claim 1, wherein the sensing elements are configured to detect a shape of the fingerprint.

6. The display device of claim 5, wherein the sensing elements are distributed with a density sufficient to detect the shape of the fingerprint.

7. A display device comprising:
a display surface configured to display an image:
a speaker unit comprising:
a sensing substrate and a speaker cover in which speaker holes for emitting a sound to the outside are formed; and
a fingerprint sensor comprising sensing elements respectively disposed in the speaker holes,
wherein:
the speaker unit is exposed by the display surface;
the sensing substrate fixes the sending elements to the speaker cover while allowing the sensing elements to be located in the speaker holes
the sensing substrate is directly connected to the sending elements and the speaker cover;
the sensing elements are implemented as ultrasonic sensing elements; and
front surfaces of the sensing elements are set to have the same height as a front surface of the speaker cover.

8. The display device of claim 7, wherein the speaker unit further comprises a speaker module for generating the sound.

9. The display device of claim 8, wherein:
the speaker module is further configured to generate an ultrasonic signal; and
the sensing elements are configured to sense a pressure change corresponding to the ultrasonic signal.

10. The display device of claim 9, wherein each of the sensing elements comprises:
a piezoelectric element configured to generate a sensing signal corresponding to a pressure applied thereto; and
upper and lower electrodes configured to output the sensing signal.

11. The display device of claim 9, wherein the sensing elements are in contact with the fingerprint of the user.

* * * * *